(No Model.)

W. S. WESTON.
ELECTRIC METER.

No. 595,841.  Patented Dec. 21, 1897.

Witnesses:
Edmund Adcock

Inventor:
William S. Weston

UNITED STATES PATENT OFFICE.

WILLIAM S. WESTON, OF CHICAGO, ILLINOIS.

ELECTRIC METER.

SPECIFICATION forming part of Letters Patent No. 595,841, dated December 21, 1897.

Application filed May 24, 1897. Serial No. 637,818. (No model.)

*To all whom it may concern:*

Be it known that I, WILLIAM S. WESTON, a citizen of the United States, residing in Chicago, in the county of Cook and State of Illinois, have invented a new and useful Improvement in Electric Meters, of which the following is a specification.

My invention relates, primarily, to improvements in self-contained and wholly-automatic recording electric meters for continuous currents, and has for its objects, first, the elimination of a commutator in constant-current motors having one or more loops in the armature-circuit, and, second, the reduction of the friction and current variation due to rubbing contacts by the use of stationary unbroken circuits so constructed and arranged as to give with a flow of continuous current a continuous movement of the magnetic field.

The principle upon which my invention is based lies in the fact that the conductivity of the metallic circuit is more or less affected when brought into a magnetic field. In general it may be stated that the conductivity is either increased or decreased, depending upon the kind of metal used in the circuit and the intensity of the magnetic field. With the metal bismuth the effect is very great, the conductivity being decreased more than half in a strong field. By a special arrangement and construction of the circuit, which I will call the "armature-circuit" to distinguish it from the field-circuit, I have taken advantage of this principle in devising a non-commutating constant-current motor which may be employed to drive the registering-train of an electric meter or for other purposes.

My invention is illustrated in the accompanying drawings, forming a part of this specification, in which—

Figure 1:
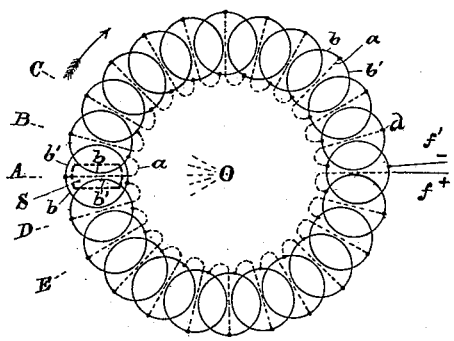
Figure 3:
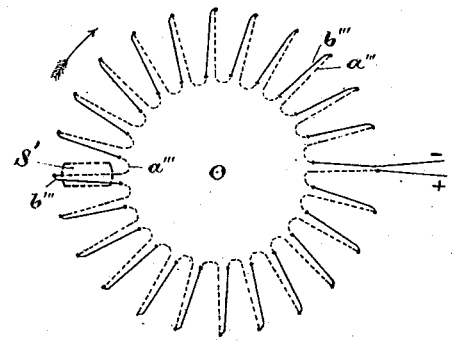
Figure 2:
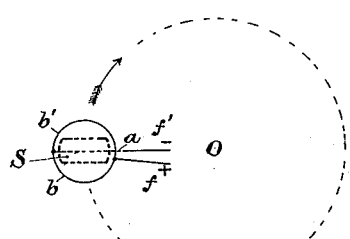
Figure 4:
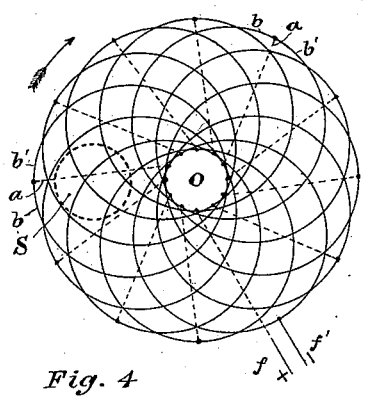
Figure 5:
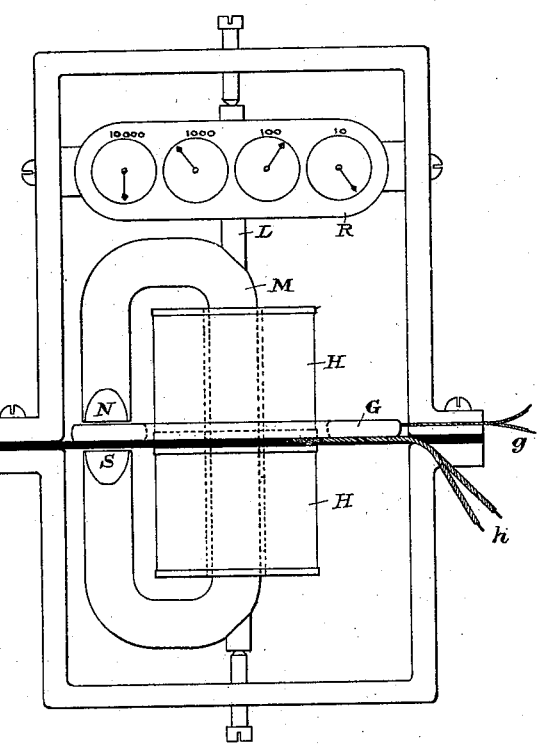

Figures 1 and 4 are diagrams of armature-circuits. Fig. 3 is a diagram of a simple circuit used for illustration. Fig. 2 is a single loop or coil of the circuit shown in Fig. 1, and Fig. 5 is a motor operating the registering-train of a meter.

Each loop of the armature-circuit, Figs. 1, 2, and 4, consists of a primary circuit (marked $a$ and shown by a dotted line) and two derived circuits, (marked $b$ and $b'$ and shown by full lines.) The derived circuits of each loop are joined to the primary circuit of the next loop, and so on through the entire armature-circuit. The connections between the primary and derived circuits are shown at the dots $d$ in the drawings. If a current from an external source enters by the terminal $f$ marked plus (+) on the right of Fig. 1, it will pass successively through the derived and primary circuits of each loop until it issues by the terminal $f'$ marked minus, (−.) S represents a concentrated magnetic field bounded by a heavy dotted line, rectangular in shape in Figs. 1 and 2 and circular in Fig. 4. For convenience and uniformity of description and illustration the assumption is made that the lines of force pass from the observer through the illustration, which would be the case if a south pole was presented to the under side of the paper. The armature-circuit loops are arranged symmetrically about an axis O in a plane perpendicular to the axis and have in relation to the magnetic field a rotative movement about the same axis. If the field is stationary and the coil movable, then rubbing contacts will need to be provided for the terminals $f$ $f'$ marked + and −. If the field is movable, then the terminal may be connected directly with the external circuit.

The derived circuits $b$ $b'$ of each armature-loop are of bismuth or any other material whose conductivity is affected by the magnetic field. They are practically equal in length and separated so far that only one of any pair can be within the concentrated magnetic field at the same time. In the illustrations the derived circuits $b$ $b'$ are shaped as semicircumferences and combine to inclose a circle whose plane is perpendicular to the lines of force. The two derived circuits $b$ $b'$ of each loop, besides being a part of the total armature-circuit, constitute in themselves a closed local circuit of comparatively low resistance, whose function will be noted hereinafter.

It is to be noted that by "armature-loops" I mean any arrangement of the armature-circuit whereby for every component of the circuit giving a flow of current from the external source across and cutting the lines of force there is also a component of the circuit giving a flow of current cutting the lines of force in the opposite direction. By an inspection of Fig. 1 it will be seen that a current entering by the terminal $f$ marked $+$ flows toward the center of rotation in the primary circuit of each loop and from the center in the derived circuits and that for the total armature-circuit the flow of current toward the center is equal to the flow from the center. Now on the assumption that the derived circuits are in no wise affected by the magnetic field a complete rotation of the armature will cause the lines of force to be crossed by currents flowing equally in opposite directions. An inspection of Fig. 3 demonstrates this fact more clearly. In this Fig. 3, which I have introduced to illustrate by comparison the peculiar features of my invention, I have shown a simple armature-circuit looped symmetrically about an axis O in a plane perpendicular to that axis. Each loop consists of an element of circuit $a'''$ and $b'''$. A current entering by the terminal marked $+$ flows toward the center of rotation through the elements $a^3 a^3$ and from the center through the elements $b''' b'''$ and of necessity upon rotation crosses the lines of force of the field $S'$ equally in opposite directions.

The constructional difference of my armature-circuit from a simple circuit, as illustrated in Fig. 3, consists in taking certain elements of the simple circuit $b''' b'''$ and, so to speak, splitting them each into two halves or parts and separating the split portions, so that only one portion of each pair is in the magnetic field at the same time.

Assuming the lines of force to pass in a direction from the observer through the illustration in a practically concentrated mass at $S'$, Fig. 3, and the current flowing in the armature-circuit in the direction already described, it will be seen that the magnetic field acts on the elements $a''' a'''$ to rotate the armature in the direction indicated by the arrow and on the elements $b''' b'''$ to rotate it in the opposite direction, but the current in the elements $a''' b'''$ being equal and opposite, the field strength remaining the same, an equilibrium is established between the forces, and no rotation due to their action takes place. An equilibrium would also be established for the armature construction shown in Fig. 1, provided the conductivity of the derived circuits or elements $b b'$ was unaffected by the magnetic field, for in that case the current in the derived circuits $b b'$ brought into and acted upon by the magnetic field is the same as that in the primary circuit $a$. By using, however, a material in the derived circuits whose conductivity is affected by the magnetic field the equilibrium is destroyed. If the conductivity is decreased, the armature will rotate in the direction of the arrow, for the reason that of the total amount flowing in the primary circuits $a a$ within the magnetic field less than one hundred per cent. flows in those portions of the derived circuits lying within the field. For instance, the current in the elemental or primary circuit $a$ on the radial line A O, Fig. 1, is greater than in the two adjacent but independently derived circuits $b b'$, which cut the magnetic field, because the mates to these derived circuits are beyond the field and unaffected by it as to conductivity and consequently take the greater portion of the current. The armature will therefore rotate under action of the greater amount of current in the direction indicated.

In substance I produce a rotative movement by passing currents through a magnetic field in one direction and providing means and a method for returning a portion of that current without cutting the lines of force which produced the rotation and without commutation or interruption of the armature-circuit. It might be said that a portion of the return current surged or flowed around the lines of force as they passed.

The action will be understood more fully from a discussion of Fig. 2. In this a single loop of the armature rotates in the direction indicated about the center O. The current enters by the terminal $f$ marked $+$ and passes out by the terminal $f'$ marked $-$. As the armature rotates the lines of force are cut by the full current flowing toward the center in the primary dotted circuit $a$, and therefore an impulse of acceleration is given to the rotation. On the other hand, an impulse of retardation is given when the lines of force are cut by the current flowing in the opposite direction in each of the derived circuits $b b'$. Now note that as the circuit $b'$ approaches and enters the field its conductivity is greatly reduced, and for the time being is considerably less than that of circuit $b$ and therefore carries less than half the full current and receives an impulse of retardation equal to less than half the impulse of acceleration. Again, as the circuit $b'$ passes the field and circuit $b$ approaches the conductivity of $b'$ increases and that of $b$ decreases, so that as the latter passes the lines of force are cut by less than half the full current, and the circuit receives a retarding impulse equal to less than half that of acceleration. From this it will be seen that by the excess of the accelerating impulses over the retarding impulses rotation is maintained in the direction indicated. The current in the derived circuits increases in the more remote member as they approach the field and then serges or flows around the field into the first member that has passed.

More than two derived circuits of variable conductivity can be used, provided they do not all move in the actuating-field at the same time.

In the description heretofore given the conductivity of the derived circuits is assumed to be decreased in the magnetic field. A material whose conductivity is increased will give practically the same results, except as to the direction of rotation. In the above discussion of Fig. 2 in that case the impulses of retardation would be greater than that of acceleration—in other words, a balance of acceleration in the opposite direction.

Fig. 4 shows a more complicated arrangement of the armature-circuit. In principle it is the same. The current flows relative to the lines of force in one direction in the primary portions of the circuit and in the opposite direction in each pair or group of derived circuits.

The number of loops of the armature-circuit are governed only by the requirements of the external-circuit current and voltage. The loops in the radial lines C B A D E may be drawn as close together as desired, and the number increased to that ratio of spacing.

As the armature rotates there are counter electromotive forces developed in the primary circuit $a$ and the derived circuits $b$ $b'$. For armature-circuits of more than a few loops these forces practically neutralize each other so far as the external circuit is concerned, but for the closed local circuit of the pair of derived circuits $b\ b'$, the resistance being low, the counter-current is very large and increases with the speed of rotation. This counter-current soon becomes equal in its effect to the resultant effect of the external current and establishes an equilibrium of rotation. Because of this equilibrium the speed is closely proportional to the strength of the external current. This peculiar feature of my invention makes it especially adaptable as an electric meter.

In the discussion of Figs. 1, 2, 3, and 4 I have considered the armature as movable about the center O. It would amount to the same thing if the field moved about the same center in the opposite direction.

In Fig. 5 I have shown a motor in elevation in which the armature and field coils are fixed and the field-core and its pole-pieces arranged to rotate on its axis of magnetization. The armature-coil G, built up on the plan shown in Fig. 1, and the field-coils H H are mounted on a non-inductive plate I and concentric with the shaft L. The field-core M is mounted on the shaft L in suitable manner and is provided with curved pole-pieces N S, designed to reduce to a minimum the air-gap of the magnetic circuit and therefore concentrate the lines of force in a narrow space through which the armature has in respect to the pole-pieces a relative movement as the core and pole-pieces rotate. R is a registering-train for recording the revolutions of the shaft L. The terminals $g$ of the armature and $h$ of the field-coils are connected directly in the external circuits. As the operation of this motor has been fully illustrated in the discussion of Figs. 1 and 2 further description is unnecessary.

It is quite obvious that a variety of motors may be designed, all of which may depend for their action upon the means and the method comprehended in my invention, and I therefore do not limit my claims to the special design herewith shown and described and used for the purposes of illustration.

While I have in Fig. 5 illustrated my invention as an electric motor for driving the registering-train of a meter, and which, as before stated, it is specially adapted and particularly fitted for use, in combination with such registering-train, it will of course be understood by those skilled in the art that it may be used for other purposes, and I therefore do not limit myself to the use of my electric motor in this particular connection or combination, but claim the same, broadly, for all uses or purposes to which it may be applied.

I claim—

1. In an electric meter, the combination with a registering-train, of an electric motor for driving the train having armature-loops composed each of a primary circuit and two or more separated derived or divided circuits, the latter being of material whose conductivity is varied or affected by the magnetic field, thus producing a state of unequilibrium between the accelerating impulse caused by the current flowing in one direction through the primary circuit, and the opposite or retarding impulse caused by the current flowing in the opposite or return direction through the several derived or divided circuits of the loop, as each loop is brought within the influence of the field, substantially as specified.

2. In an electric meter, the combination with a registering-train, of an electric motor for driving the train having a stationary non-commutated armature, a stationary field-coil and a rotary pole-piece, the armature-loops being composed each of a primary circuit and two or more separated derived or divided circuits, the latter being of material whose conductivity is varied or affected by the magnetic field, thus producing a state of unequilibrium between the accelerating impulse caused by the current flowing in one direction through the primary circuit, and the opposite or retarding impulse caused by the current flowing in the opposite or return direction through the several derived or divided circuits of the loop, as each loop is brought within the influence of the field substantially as specified.

3. A non-commutated continuous-current electric motor, having armature-loops composed each in part of a primary-circuit wire through which the current flows in one direction and in part of two or more divided or derived circuit wires through which the current returns or flows in the opposite direction, the latter being of material whose conductivity is affected by the magnetic field, substantially as specified.

4. A non-commutated continuous-current electric motor, having armature-loops composed each in part of a primary-circuit wire through which the current flows in one direction and in part of two or more divided or derived circuit wires through which the current returns or flows in the opposite direction, the latter being of material whose conductivity is affected by the magnetic field, said motor having a rotative pole-piece and non-rotative field-coil and armature, substantially as specified.

5. An electric motor having armature-loops furnished each with a greater number of paths or circuit-wires for the current flowing in one direction than for the current flowing in the opposite direction, substantially as specified.

6. An electric motor having armature-loops furnished each with a greater number of paths or circuit-wires for the current flowing in one direction than for the current flowing in the opposite direction, the conductivity of the material composing the former being modified by the magnetic field, substantially as specified.

7. An electric motor having armature-loops furnished each with a greater number of paths or circuit-wires for the current flowing in one direction than for the current flowing in the opposite direction, the conductivity of the material composing the former being modified by the magnetic field, said motor having a rotating pole-piece and a non-rotating field-coil and armature, substantially as specified.

8. A non-commutated continuous-current motor, whose action is the resultant effect of passing a definite quantity of current across the lines of force of the magnetic field one or more times in one direction and of returning that current each time across and around the same lines of force by a divided circuit, having fixed connections, whose conductivity varies with its position relative to the magnetic field, substantially as specified.

9. A non-commutated continuous-current motor having a compound armature-circuit, of variable conductivity constructed to give a greater number of amperes of current for cutting the lines of force of the magnetic field in one direction than for cutting the same lines in the opposite direction, substantially as specified.

10. A motor having fixed field and armature coils and movable pole-pieces in which movement is maintained by an unbalanced current condition induced in the armature-coils by reason of their conductivity being modified in the presence of the magnetic field of the moving pole-pieces, substantially as specified.

11. A motor having a non-commutated armature-circuit continuous with the external circuit in which the unbalanced current condition producing the motion is produced and maintained by the action of the magnetic field in the conductivity of the armature-circuit, substantially as specified.

12. The combination with a field-magnet of an armature having loops with a greater number of paths or circuit-wires for the current flowing in the one direction than for the current flowing in the other direction, the conductivity of the former being modified when in the presence of the magnetic field, substantially as specified.

WILLIAM S. WESTON.

Witnesses:
EDMUND ADCOCK,
H. M. MUNDAY.